US006939233B2

(12) United States Patent
Emmerson

(10) Patent No.: US 6,939,233 B2
(45) Date of Patent: Sep. 6, 2005

(54) CLIENT-SERVER SYSTEM

(75) Inventor: Francis Emmerson, Windsor (GB)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/040,459

(22) Filed: Jan. 9, 2002

(65) Prior Publication Data

US 2002/0103019 A1 Aug. 1, 2002

(30) Foreign Application Priority Data

Jan. 31, 2001 (GB) ............................................ 0102422

(51) Int. Cl.[7] .............................................. A63F 9/24
(52) U.S. Cl. ...................................................... 463/41
(58) Field of Search ............................... 463/40–42, 43, 463/29, 36, 39, 37, 46, 1–13, 16–20; 273/138.1, 138.2, 148 R, 148 B, 440, 459–461; 455/403, 422; 379/93.13, 900; 709/201; 725/105, 106, 143, 153

(56) References Cited

U.S. PATENT DOCUMENTS

| 5,586,937 A | * | 12/1996 | Menashe ..................... 463/41 |
| 5,643,086 A | | 7/1997 | Alcorn et al. ................ 463/29 |
| 5,768,382 A | | 6/1998 | Schneier et al. ............... 380/23 |
| 5,871,398 A | * | 2/1999 | Schneier et al. ............... 463/16 |
| 5,944,608 A | | 8/1999 | Reed et al. .................... 463/40 |
| 5,970,143 A | | 10/1999 | Schneier et al. ............... 380/23 |
| 6,071,190 A | | 6/2000 | Weiss et al. ................... 463/25 |
| 6,104,815 A | | 8/2000 | Alcorn et al. ................ 380/251 |
| 6,149,522 A | | 11/2000 | Alcorn et al. | |

FOREIGN PATENT DOCUMENTS

| WO | 97/19537 | 5/1997 | ............. H04L/9/32 |
| WO | 98/30297 | 7/1998 | ............. A63F/9/22 |
| WO | 00/70848 | 11/2000 | .......... H04M/1/725 |
| WO | 01/33546 | 5/2001 | .......... G10K/15/02 |

OTHER PUBLICATIONS

European Search Report.

* cited by examiner

*Primary Examiner*—Mark Sager
(74) *Attorney, Agent, or Firm*—Antonelli, Terry, Stout & Kraus, LLP

(57) ABSTRACT

A client-server system wherein the server sends a game to the client, the game having associated therewith predetermined operating parameters that are encrypted by the server, the client receives the game and the game is stored onto the client, and the client returns an outcome of the game to the server, the outcome of the game being contained in encrypted signals.

17 Claims, 4 Drawing Sheets

CLIENT-SERVER SYSTEM

BACKGROUND OF THE INVENTION

1. Field of the Invention

The present invention relates to a client-server system, in particular a client-server system in the context of mobile gaming.

2. Description of the Prior Art

Mobile gaming is a term used to refer to all aspects of electronic games in the context of mobile communications. Nowadays, it is not uncommon for portable radio communication devices such as mobile phones to have, pre-loaded on a memory of the phone, content relating to one or more electronic games. The games can be played on the mobile phone through the phone's User Interface normally involving the use of the LCD and one or more of the keys. In order to play a game, the user navigates through the phone's various menu options to the Games options and then selects the particular electronic game he or she wishes to play. Certain keys of the mobile phone's keypad will be pre-assigned for enabling the user to control certain predetermined features of the game, usually in relation to other features of the game which are under the control of the software of the game. In this way, the user can be regarded as playing 'against the computer'. Additionally, in a two (or more) player game, each user (player) has control over his/her particular game's characters or features with which he/she plays against the other player(s).

In order to afford variation in gameplay, built into the games software, typically, is the ability to have different levels of gameplay ranging in complexity. This is usually implemented in the software by making changes to characters, features, aspects and other parameters of the basic gameplay.

SUMMARY OF THE INVENTION

Against this background, the present invention, in one aspect resides in a client-server system wherein the server sends a game to the client, the game having associated therewith pre-determined operating parameters that are encrypted by the server, the client receives the game and the game is stored onto the client, and the client returns an outcome of the game to the server, the outcome of the game being contained in encrypted signals.

By means of the invention, an entire electronic gaming environment is controlled and facilitated through a central games server. The server enabled provision of encryption for gaming data affords a gaming environment that is relatively 'tamper proof' from an end user perspective, and thus the invention makes for realistic competition between different users. The invention utilizes network communications to provide a system that is fully automated such that electronic games and/or levels thereof can be downloaded to users' mobile phones, and the outcome of the gameplay uploaded to the server. The server can then administrate the system, for example, computing and posting high scores or league tables, and arranging further fixtures and matches. Thus, the invention encourages players to connect to the network and participate in global competitions.

The encryption for gaming data employed by the games server for controlling the mobile gaming arrangements is designed to be used in both downlink and uplink connections. For example, in respect of a game that is to be downloaded to a user there may be encryption data included in a header with pre-determined operational parameters of the game, for instance a last play-by time limit. The games data may also include the games software required to characterize gaming parameters and allow play of the game, thereby defining the look and feel of the electronic game. If the user does not play the game by the pre-set play-by time limit an encrypted void result may be returned to the server. Additionally, the gaming data executable code may include one-play only instructions such that the downloaded game may only be played once by the user. Accordingly, this would prevent the user from making repeated attempts at the game in order to improve the result. The encryption data may further include a return header by which the user's gameplay result is encoded and returned to the server. Accordingly, this would prevent the user from manipulating the gameplay result that is returned to the server.

Encryption is performed by encryption means and may include channel encryption and/or data encryption. Security of the system is further enhanced by using authentication procedures between the server and the client terminal. In order to provide for a secure session between the server and a client terminal, advantage may be taken of exchanging public, private and secret keys.

In the context of for example a football game, the invention may facilitate a cup knock out competition, in which the server organizes and runs the competition. In this example, the server generates a list of fixtures between football teams. The football teams are 'managed' by end users (players) or the server itself. The players are required to play out fixtures determined by the server. Each fixture has an associated identifier code which is created in the server. The player selects to play the fixture from the menu in games software in the phone and the appropriate game begins and is played. By using encryption, the opportunity for a player of restarting a match in which the player may be losing is reduced, since in doing so a void match is returned to the server. Once the player has finished the match, the result of the fixture is encrypted with the original fixture code by means of a score encryption application and automatically returned to the games server. The games server assimilates the results and then works out the next round of fixtures and sends out the next fixture codes. Fixtures could have a time limit associated with them so that players are required to complete a match within a certain predetermined time period. This ensures the smooth flow of the competition. A code submitted after a valid time would be ignored and the server would treat the game as a loss after the expiry date.

Since data manipulation in respect of the game results is carried out remotely in the server, the limited memory of mobile phone is not taken up with performing such tasks. Hence, the software requirement and memory space needed for electronic games on mobile phones is not as demanding as it otherwise would need to be.

A further advantage is that league tables and the like that are stored on the games server can be updated and modified centrally.

The invention has further benefits in that a content provider, who may be the mobile phone manufacturer or a third party, continues to design and develop more challenging and innovative versions and levels of the game, while the user will continue to remain interested and engaged. In addition, the mobile phone manufacturer or content provider benefits in increased traffic and stimulating content for the mobile phone manufacturer's internet site.

The server may also provide for secure, direct game play between one or more players against one another. This may be implemented by employing unique identification codes associated with each player, the communications between players using only these unique identification codes. Accordingly, the actual identity of players is protected and their anonymity is preserved. The server then displays high score tables using the unique identification codes. At the server, users could select which games they were interested in playing and choose whether or not to "activate" themselves. Activation would mean that they were ready to play a game and accept challenges from other players. Challenges between players could also be made through the server using the unique identification codes. Once a player had played a game, they would become "inactive". This would sidestep the problem of players constantly receiving messages asking them to play. Once a player had accepted a challenge, all outstanding challenges issued before the time of acceptance would be erased so as not to create huge backlogs of messages. Activation could be done by checking a box on a website or by sending out a message request. It may be possible to allow true identities to be apparent in self-contained user defined user sub-groups of say friends and family. There may also be monitoring and accounting means for monitoring use of the gaming facility on the server for computing a payment to be made by the user.

BRIEF DESCRIPTION OF THE DRAWINGS

In order to aid a better understanding of the present invention, an embodiment of the invention will now be described. This should not be construed as limiting the invention, but merely as an example of a specific way of putting the invention into effect. In particular, the invention will be described with reference to the accompanying drawings in which.

DETAILED DESCRIPTION OF THE INVENTION

In general terms, an electronic game, designed to be played on a mobile phone, is created by a content provider, who may be the mobile phone manufacturer or a third party. Typically, the electronic game comprises a games engine that provides the general functions of the game including instructions and routines for gameplay, for example by drawing of library functions that define how games characters may interact during game play. The electronic game also has gaming parameters that set out the environmental factors that define the backdrop to the game. Then there are gaming parameters relating to characters of the games, these being entities of the game under user control and with which the user during gameplay associates himself, for instance a team in a sports game, or a fighter in a combat game. In the games content, a combination of these factors define the look and feel of the game, its characters, its objectives, its rules of operation. The games engine also includes means for decrypting data received from a server and interfacing the decrypted data with the gaming parameters, and means for encrypting data for transmission to a server.

The content provider additionally creates new levels and/or versions for the game. When new levels and/or versions are applied to the game it modifies the games content. Modified games content has associated with it an identifier tag that identifies the version that has been used in its construction.

The mobile phone manufacturer may embed the games content onto the phone during manufacture, or authorize downloading of the games content onto the phone.

Figure 1:
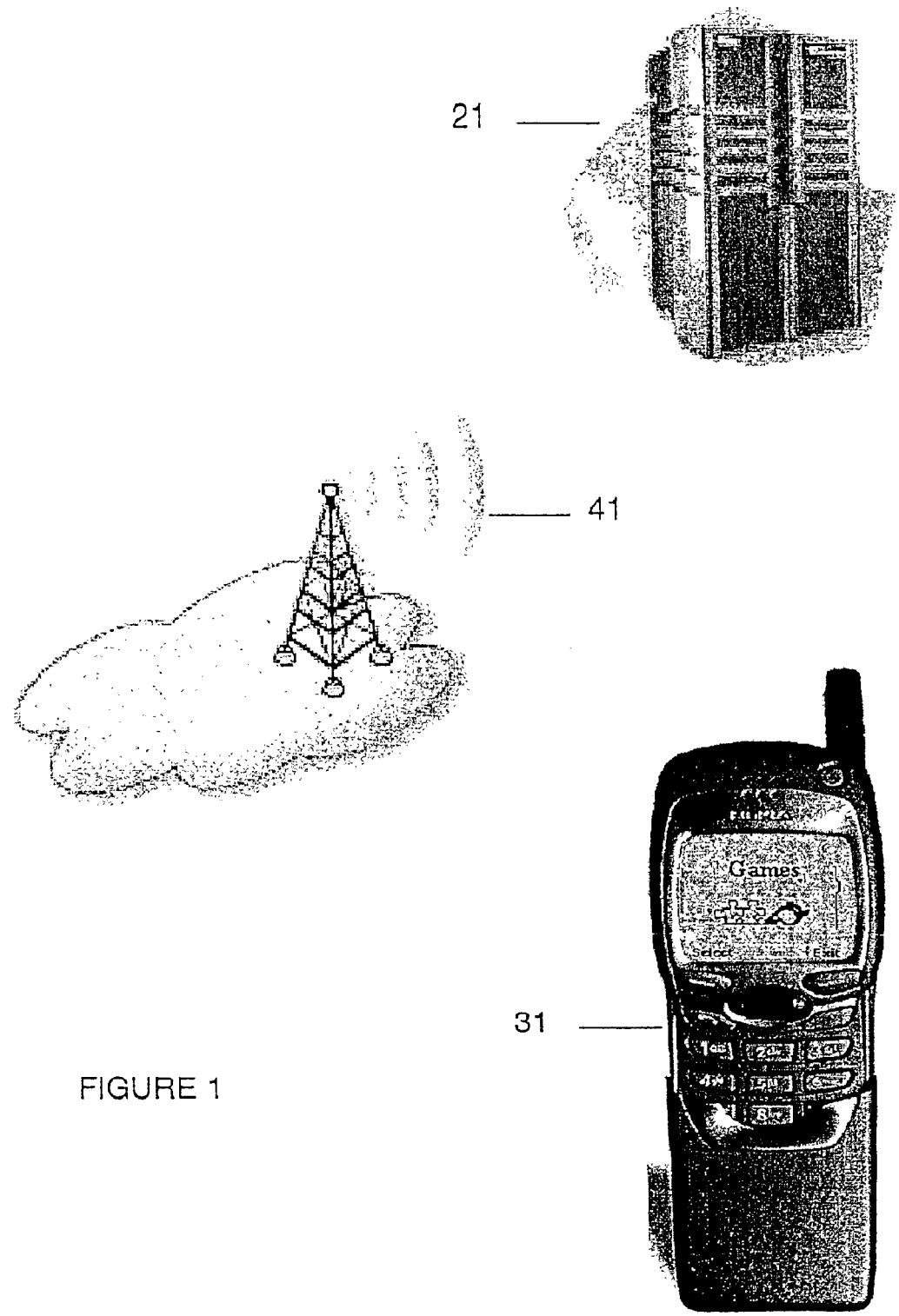
FIG. 1 is a schematic of client-server system in accordance with a preferred arrangement of the present invention.

Referring to FIG. 1, there is shown a server 21 that facilitates the gaming environment, an end user's mobile phone 31 that contains the games content and an operator network 41 that provides a telecommunications service to the mobile phone. The server 21 has a unique URL address and through this address is accessible through the end user's phone 31. Access to the server may be by methods known in the art via dial up numbers such as bulletin boards, and World-Wide-Web (WWW) addressing using URLs where the phone is WAP or iMODE enabled.

Turning to the end user, the end user has a mobile phone 31 carrying the games content, and is provided with a wireless communication service through the operator network 41. The end user accesses the server and elects to participate in a selected 'global' games contest. The user is then sent the appropriate game or game level from the server. Using the phone's User Interface the user plays the game sent by the server. The end user may play the game in either a stand-alone fashion or interactively with other users. At the end of the game play, the outcome is sent from the end user mobile phone to the games server. A more detailed description of this now follows with reference to FIGS. 2 and 3.

Figure 2:
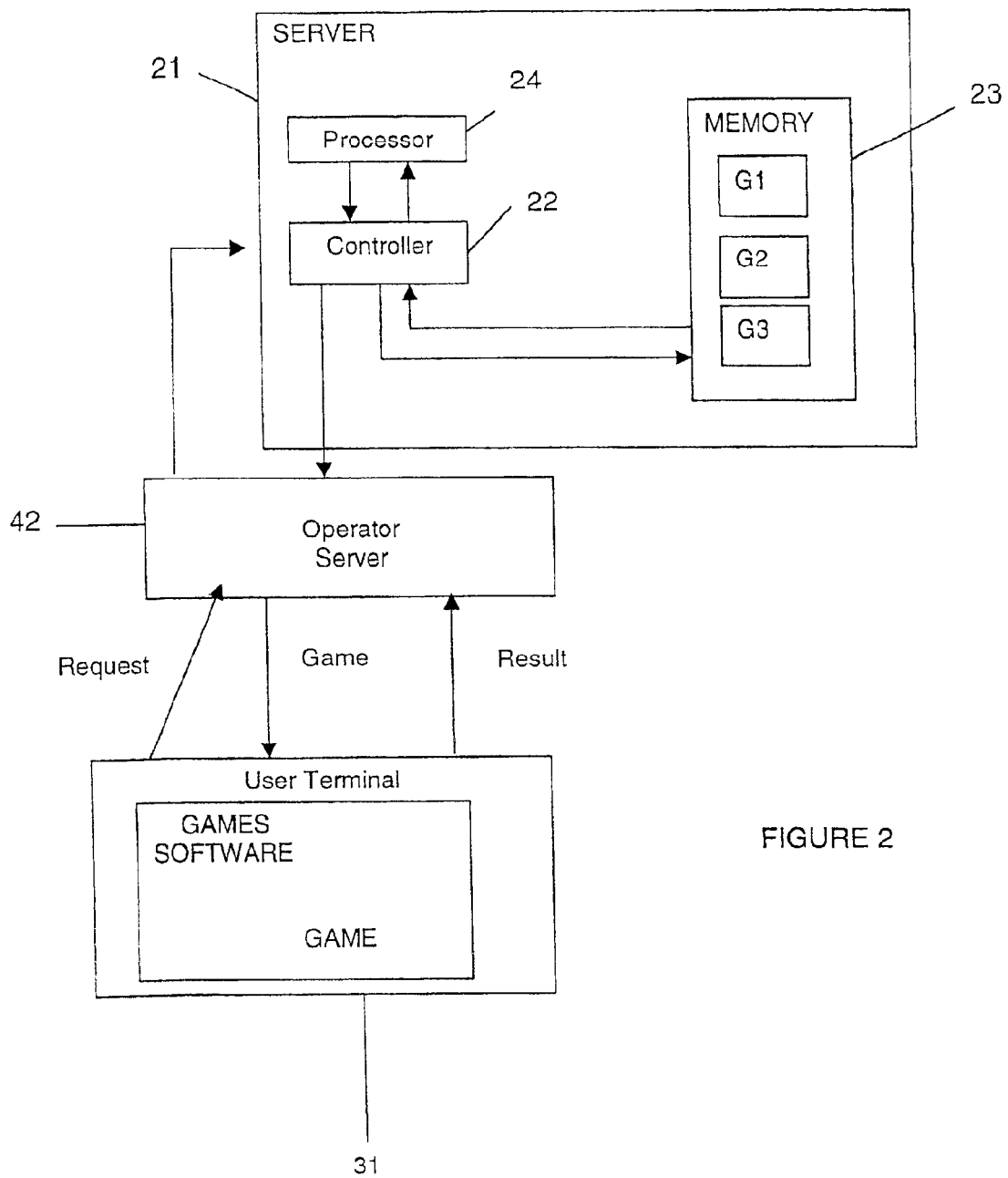
FIG. 2 is a block diagram illustrating selected functional aspects of the client server system of FIG. 1.

Referring to FIG. 2, there is shown an end user mobile phone terminal 31, which through the operator network having an operator server 42 can access a mobile phone manufacturer's server 21 having a memory containing games that can be played as part of a global games competition.

An end user 31 that wishes to participate in a global games contest goes on-line and makes a request through the mobile phone 31. The on-line connection may be a discontinuous connection, as well as a continuous one. The request may be a direct menu-driven option that the user clicks onto to send the request. The menu-driven option could be a direct link from games menu option, which would save having specifically to open, for instance a browser application of the mobile phone.

Figure 3A:
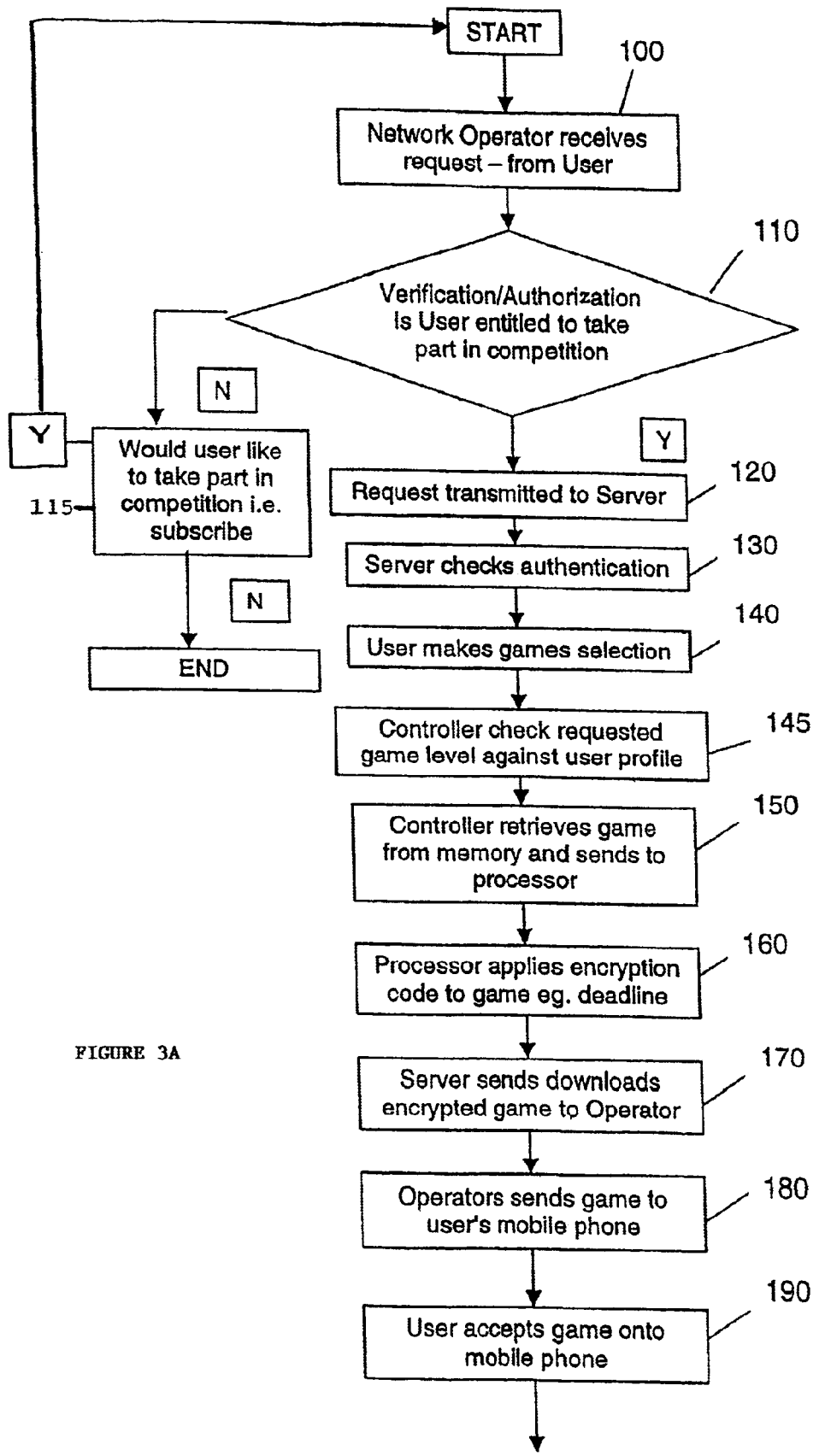
FIG. 3 is a flow chart outlining a preferred way of effecting downloading of content in the client-server system of FIGS. 1 and 2.
Figure 3B:
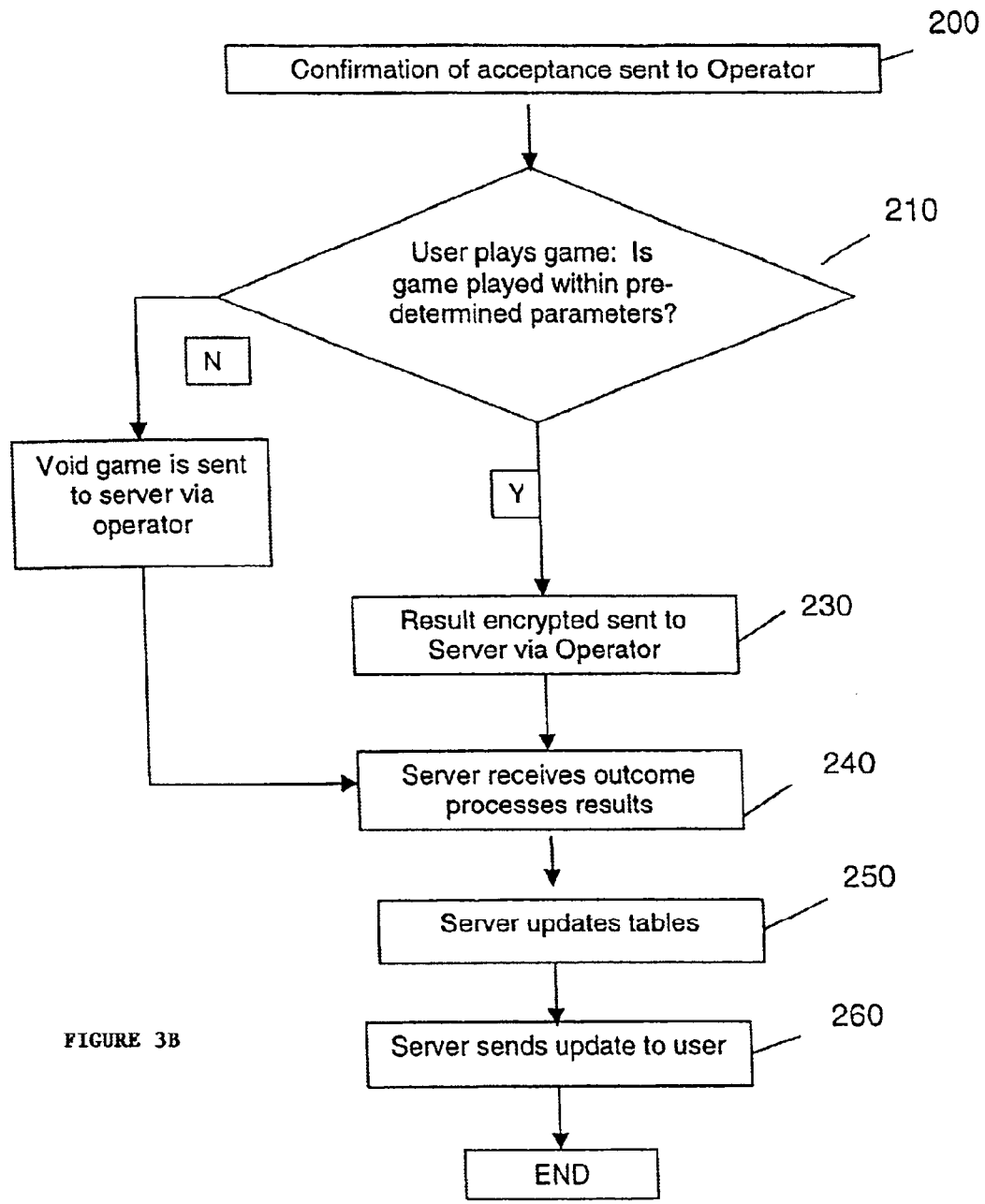

The user's request is received first by the network operator at the operator server 42, this is indicated in FIG. 3 at block 100. Here a series of checks is carried out in relation to the request in an authentication process. As indicated at block 110 in FIG. 3, it is checked whether the user subscribes to the appropriate tariff to entitle him/her to access the server in order to participate in the requested service. Accordingly, the user's identity is checked along with his/her tariff subscription. If it is determined that the user does subscribe to the appropriate tariff, the operator server forwards the request to the URL address identifying the mobile phone manufacturer's games server 21, as indicated at block 120.

If, on the other hand, the user is identified as not being a subscriber on the appropriate tariff to allow participation in the desired server controlled competition, flow passes to block 115 in which the operator server sends a message to the user denying him/her the request. At this juncture, the message may contain information informing the user of steps to be taken in order to apply to subscribe to the correct tariff for participating in the global games competition. If at block 115 the user agrees to take part in the competition The completes the necessary subscription requirements and flow returns to START.

Returning to the situation where the network operator accepts the user and engages the manufacturer's server to service the request, the request received at the server undergoes further authentication and identification at block 130, for instance to check for compatibility between the user's mobile phone and the competition requested. This may be on the basis of an identifier tag associated with the user's handset software.

On successful authentication at the server, the server presents the user with a series of choices as to which competition (e.g. G1, G2, or G3) the user would like to participate in. The server may offer further information on each of the games. The user then makes a selection of one of the competitions in which he/she wishes to participate. This is indicated at block 140.

The selection then undergoes further processing in the server. Initially, the selection passes to a controller 22 that checks at block 145 that the requested game is the appropriate one for the particular user to play. For instance, if the user is a novice at a particular game the server ensures that the game to be sent to the user is the level 1 (i.e. easiest) version of the game. Such a check may be made by reference to a user profile that may be stored on the server, or uploaded to the server from the phone. The games controller 22 then accesses the memory storage 23 holding the appropriate game using a memory address. From there at block 150 the required game is retrieved by the controller 22 and transferred to a processor 24. In the processor 24, encryption means is used to apply encryption data to the game as indicated at block 160. The encryption data introduces certain predetermined codes into the games data and outputs a fixture code with certain qualifiers such as a 'play-by' date. A fixture code might include the following: {Name of Team to be Played; Attacking Ability of Team; ID of Fixture Code} Following appropriate checks the game including the fixture code is transmitted according to block 170 to the operator server 42.

The operator server receives the games data and verifies that it is the game for the competition requested by the user. Following verification the operator server downloads the game to the requesting user's mobile phone as indicated at block 170.

In receipt of the game at the mobile phone, a message is displayed on the phone's LCD indicating that game has arrived. The mobile phone's processor carries out a series of error checks to ensure that all the data has been faithfully received, if not then an error message is transmitted to the operator to re-send the game. If the error checks confirm complete error free receipt of the game, the user may be afforded an opportunity to view the game in order to confirm that it is approved. At this stage, the user may be informed of any surrounding information associated with the gameplay, for instance any deadline by when the game must be played and a result submitted to the server. The user then uses the menu options to accept and save the game onto the phone memory as indicated at block 190 in FIG. 3 and indicated by GAME in FIG. 2. Alternatively, there may be automatic saving to memory on verification of error free receipt of game. The code would be stored in a part of memory that does not depend upon the phone remaining powered up, or with a charged battery.

The operation of saving the game on the phone causes a signal to be transmitted to the operator that the game has been saved in the phone. This acts as a confirmation of receipt and acceptance by the user as shown at block 200.

The user then plays the game off-line. The games engine runs the encrypted data through its decryption means and interfaces the encrypted data with the gaming parameters. The games engine provides responses to the encrypted data for determining whether the game is played within the criteria set out in the encryption data. For instance, if the game is played within the set time limit, or if the game is played according to the rules, or has the game been re-set at any time. If the games data obtains a response that determines that the game has been played outside any of these parameters then a null game is sent to the server at 230 via operator. The gaming parameters may allow a user to pause a game and return to it at some later time. If the game is played within predetermined parameters the result is encrypted at the phone and sent to the server via the operator at block 230.

The game may be played interactively between two or more users in a multi-play scenario. In this situation, the encryption data including the operational parameters is applied to all users. The server then controls synchronization between the players.

When a result is obtained it is sent as encrypted data, the encrypted data includes: {ID of Fixture Code; Score Line; Void or Valid Value; User's ID} The ID is used to determine whether or not the game has been played within its time limit. This is determined at the server and is not reliant on the in-phone clock as this date may easily re-set by a user. A network 'trusted' clock may be used as the basis for keeping time. If the fixture code refers to a game that should have been played in a previous game period, then the result of the game is treated as a loss. The score line records the number of points scored by each team. The Void or Valid value is a flag which represents whether or not the players has quit the game. The User ID is used to identify a unique user.

As indicated at block 240, the server receives the outcome as either a result perhaps including a score or a void game. The server registers the result and on that basis updates the league table at block 250. Any user may view the new tables.

The server may then send a message confirming receipt and informing the user of where The stands in the league table at block 260. Additionally, the server may invite the user if The wishes to play another game. That is to say, the act of submitting a new result could trigger the games server to send out the next fixture or level in the competition.

Transfer of signals between the user's mobile phone and the server may use any appropriate modes such as WAP and SMS, advantage being taken of security protocols established under these modes. For example, in order to establish a secure session between the server and the mobile phone there may be an exchange of public keys, followed an exchange of secret keys.

In other arrangements, the operator may simply provide the gateway for establishing the links to the server, the authentication and verification processes being carried out in the server.

Accordingly, it should be apparent that the games server arranges the competition and games be downloaded on-line. Players then play the game off-line, however the encrypted operational parameters and authentication procedures prevent the player from re-setting the game and replaying until he has achieved a scoreline that satisfies him. A secure system is thereby provided in which the risk of computer hacking of the data on the handset is minimized, and the risk of third party interception of the data in the network is diminished.

The present invention may be embodied in other specific forms without departing from its essential attributes.

Reference should thus be made to the appended claims and other general statements herein rather than to the foregoing description as indicating the scope of the invention.

Furthermore, each feature disclosed in this specification (which terms includes the claims) and/or shown in the drawings may be incorporated in the invention independently of other disclosed and/or illustrated features. In this regard, the invention includes any novel feature or combination of features disclosed herein either explicitly or any generalization thereof irrespective of whether or not it relates to the claimed invention or mitigates any or all of the problems addressed.

what is claimed is:

1. A client-server system, comprising:
    a client terminal and a server, wherein the client terminal and the server are remote from one another, the client terminal and server being operable in and switchable between an on-line connected mode and an off-line disconnected mode, wherein in the connected mode the client terminal and server are connected to one another through a communication link such that data is exchangeable therebetween and in the off-line disconnected mode the client terminal and server are disconnected from one another, and wherein the server comprises memory for storing game data that defines an electronic game and encrypts said game data in accordance with one or more pre-determined operational parameters, and the communication link is utilized to transmit the encrypted game data to the client terminal during an on-line connected mode session, and wherein the client terminal comprises a memory for storing received encrypted game data, a processor for executing the encrypted game data, a controller for allowing a user to play the electronic game during an off-line disconnected mode session in a manner whereby the user actuates the controller to control the outcome of the game, and wherein the processor in response to the gameplay by the user processes the outcome and utilizes the communication link to transmit a result of the gameplay to the server during an on-line connected mode session.

2. A client-server system according to claim 1, wherein: the operational parameters including instructions on how to encrypt the outcome of the game.

3. A client-server system according to claim 1, wherein: the client terminal decodes encrypted game data.

4. A client-server system according to claim 1, wherein: the user plays the game and the client terminal encrypts a result to be returned to the server.

5. A client-server system according to claim 1, wherein: one of said one or more operational parameters comprises a time limit for completing the game and returning an encrypted game outcome to the server.

6. A client-server system according to claim 5, wherein: if the game is not completed by the expiry of said time limit, then on expiry of said time limit a void game outcome is encrypted and returned to the server.

7. A client-server system according to claim 1, wherein: if the game is reset then a null game is encrypted by the processor and returned to the server.

8. A client-server system according to claim 1, wherein: the server on the basis of the outcome computes an updated result.

9. A client-server system according to claim 8, wherein: the updated result is transmitted to the user.

10. A gaming device including games content comprising gaming parameters, and adapted to download content from a server disposed remote from gaming device, wherein:
    the gaming device and server are connectable to one another, the gaming device and the server being operable in and switchable between an on-line connected mode and an off-line disconnected mode, wherein in the connected mode the gaming device and server are connected to one another through a communications link such that data is exchangeable therebetween, and in the off-line disconnected mode the gaming device and server are disconnected from one another, the gaming device having a memory, a processor and a controller, the memory storing at least one of original and modified games content, the processor being operable to transmit in an on-line connected mode session a request for participation in a server controlled games competition provided by the server, the request comprising an identifier of the required competition, the device receiving encrypted gaming parameters from the server in an on-line connected mode session, the processor storing said gaming parameters in said memory, the processor allowing for execution of said game during an off-line disconnected mode session in a manner whereby the user actuates the controller to control the outcome of the game, and wherein the processor in response to game play by the user processes the outcome and utilizes the communication link to transmit a result of the gameplay to the server.

11. A gaming device according to claim 10, wherein: the device is a handheld electronic device.

12. A gaming device according to claim 11, wherein: the device includes a transceiver and the encrypted outcome is transmitted by signals over the air.

13. A server comprising:
    a memory for storing game data which encrypts said game data in accordance with one or more pre-determined operational parameters, wherein one of said one or more pre-determined operational parameters being an instruction to return an outcome of playing a game when said game data is executed on a client terminal, and associated communication link for transmitting the encrypted games data to the client terminal, wherein
    said server is disposed remote from the client terminal, wherein the client terminal and server are connectable to one another via a communications link, the client terminal and the server being operable in and switchable between an on-line connected mode and an off-line disconnected mode, wherein in the connected mode the client terminal and server are connected to one another through the communications link such that data is exchangeable therebetween, and in the off-line disconnected mode the client and server are disconnected from one another, the client terminal being adapted to allow a user to control and determine the outcome of gameplay of a downloaded game in an off-line disconnected mode session and in response to said gameplay uploading an outcome of a gameplay to the server in an on-line connected mode session, whereby the server receives said outcome of the gameplay and modifies one or more databases stored at, or in relation to, the server.

14. A server according to claim 13, wherein: the server manages, administrates or controls the running or organization of a game competition.

15. A computer program product loadable on a terminal comprising:
    an electronic game stored in a memory thereof, the product enabling downloading encrypted gaming parameters of the game from a server, executing the game whereby execution of the game allows a user to control the gameplay and its outcome and sending in response to the execution of game the outcome to said server, wherein said terminal is remote from the server, and are connectable to one another via a communications link, the terminal and the server being operable in and switchable between an on-line connected mode and an off-line disconnected mode, wherein in the connected mode the terminal and server are connected to one another through the communications link such that data is exchangeable therebetween, and in the off-line disconnected mode the client and server are disconnected from one another, wherein the product downloading encrypted gaming parameters of a game from a server occurs during an on-line connected mode session, the product executing the game occurs during an off-line disconnected mode session, and sending an outcome to this server occurs in an on-line connected mode session.

16. A computer program product loadable on a server, wherein:

the product enables the application of encryption data to gaming parameters of an electronic game, and provides one or more operational conditions wherein one of said operational conditions instructs a terminal that executes the game to return an outcome of the gameplay to this server, and the product providing for the sending said encrypted gaming parameters to a terminal, wherein said terminal is remote from server and are connectable to one another via a communications link, the terminal and the server being operable in and switchable between an on-line connected mode and an off-line disconnected mode, wherein in the connected mode the terminal and server are connected to one another through the communications link such that data is exchangeable therebetween, and in the off-line disconnected mode the client and server are disconnected from one another, wherein the product enabling downloading encrypted gaming parameters of a game from a server to a client occurs during an on-line connected mode session, executing the game occurs during an off-line disconnected mode session, and returning an outcome of the gameplay to the server in an on-line connected mode session.

17. A method for downloading games content from a server to a client terminal and uploading a gameplay result from the client to the server, the method comprising:

the server encrypting gaming data of the games content in accordance with a predetermined criterion and programming one or more gaming operational parameters wherein one of said one or more gaming operational parameters comprises an instruction to return an outcome of playing a game when said game data is executed on a client terminal;

transmitting the gaming data to the client terminal while the server and client terminal are connected to one another via a communication link;

the client terminal executing the gaming data while the client terminal is disconnected from the server and allowing a user to control gameplay in accordance with the gaming data so as to generate an outcome of the gameplay; and transmitting a result indicating the outcome of the gameplay from the client terminal to the server while the server and client terminals are connected to one another via the communication link.

* * * * *